United States Patent Office 3,758,287
Patented Sept. 11, 1973

3,758,287
PROCESS OF TREATING ORGANIC WASTE
Hans P. Scheel, Seattle, Wash., assignor to
Western Minerals, Inc.
Continuation-in-part of application Ser. No. 138,763,
Apr. 29, 1971. This application Aug. 28, 1972,
Ser. No. 283,987
Int. Cl. C08f 3/00
U.S. Cl. 71—12                                8 Claims

ABSTRACT OF THE DISCLOSURE

Conversion of organic waste into organic plant food is carried out by subjecting the waste to heat sufficient to sterilize, deodorize, and de-water the waste, the heat being generated by the chemical reaction of a mixture principally of magnesium oxide and sulfuric acid. Although commercial magnesium oxide may be used, a preferable source is finely ground olivine, a less highly refined and less expensive material containing a large percentage of magnesium oxide. Olivine is a mineral composed essentially of the oxides of magnesium and iron but also containing aluminum, nickel, and other trace elements. When the olivine is mixed with concentrated sulfuric acid, a paste is formed which is then mixed with the waste. The exothermic reaction which takes place produces a compost-like material which is valuable as a plant food.

CROSS REFERENCE TO RELATED APPLICATION

This application is a continuation-in-part of application Ser. No. 138,763, filed Apr. 29, 1971.

BACKGROUND OF THE INVENTION

Field of the invention

This invention relates to a process of treating organic waste for conversion thereof into organic plant food.

Prior art relating to the disclosure

The cost of disposing of organic waste such as sewage, household garbage, waste from animal, fish, and poultry processing plants, and the like is increasing, and the problems incident to the disposal of such organic waste are many and varied. It is highly desirable that these wastes be disposed of without serious pollution of the air, water, or land. These wastes are known to contain large amounts of plant nutrients which should be returned to the soil to minimize their depletion. Many of these nutrients are now lost to the soil by disposal methods now used, such as land fill operations, incineration, and disposal in rivers, lakes, and oceans.

SUMMARY OF THE INVENTION

A finely divided reactant containing magnesium oxide as its principal component is mixed with concentrated sulfuric acid to form a paste, and the paste is then mixed with the organic waste. The resulting exothermic reaction sterilizes, de-waters, and deodorizes the organic waste and produces a compost-like material valuable as a plant food. The principal objects of this invention are:

(1) To reduce the costs and eliminate many of the problems incident to disposal of organic wastes by current methods while, at the same time, salvaging, conserving, and profitably utilizing a large proportion of the plant nutrient value of the wastes to provide a plant food convenient to handle and use;

(2) To provide a process applicable to various kinds of garbage, raw sewage, and mixtures thereof;

(3) To provide a process which will substantially eliminate the need for incineration of garbage and greatly reduce the need for land fill operations;

(4) To alleviate the problem of air pollution by creating a new market for sulfuric acid, thereby providing an economic incentive for recovery of sulfur dioxide, a major air pollutant emitted by smelters and power production plants using high sulfur content coal;

(5) To provide a process capable of sterilizing and deodorizing all organic wastes, including manures, marine growth, such as seaweeds and sea grass, and other cellulosic materials, such as hay, straw, and wood waste;

(6) To provide an efficient and inexpensive process for treating organic wastes;

(7) To dispose of wastes while conserving a major portion of the nutrient value of the waste by mixing the wastes with and subjecting them to the heat of reaction of concentrated sulfuric acid and a finely ground material containing a large percentage of magnesium oxide, such as olivine;

(8) To provide a process by which a large volume of garbage or dewatered raw or digested sewage can be treated and disposed of at a cost less than that of conventional methods or processes of treatment now in use.

DESCRIPTION OF THE PREFERRED EMBODIMENTS

Figure 1:
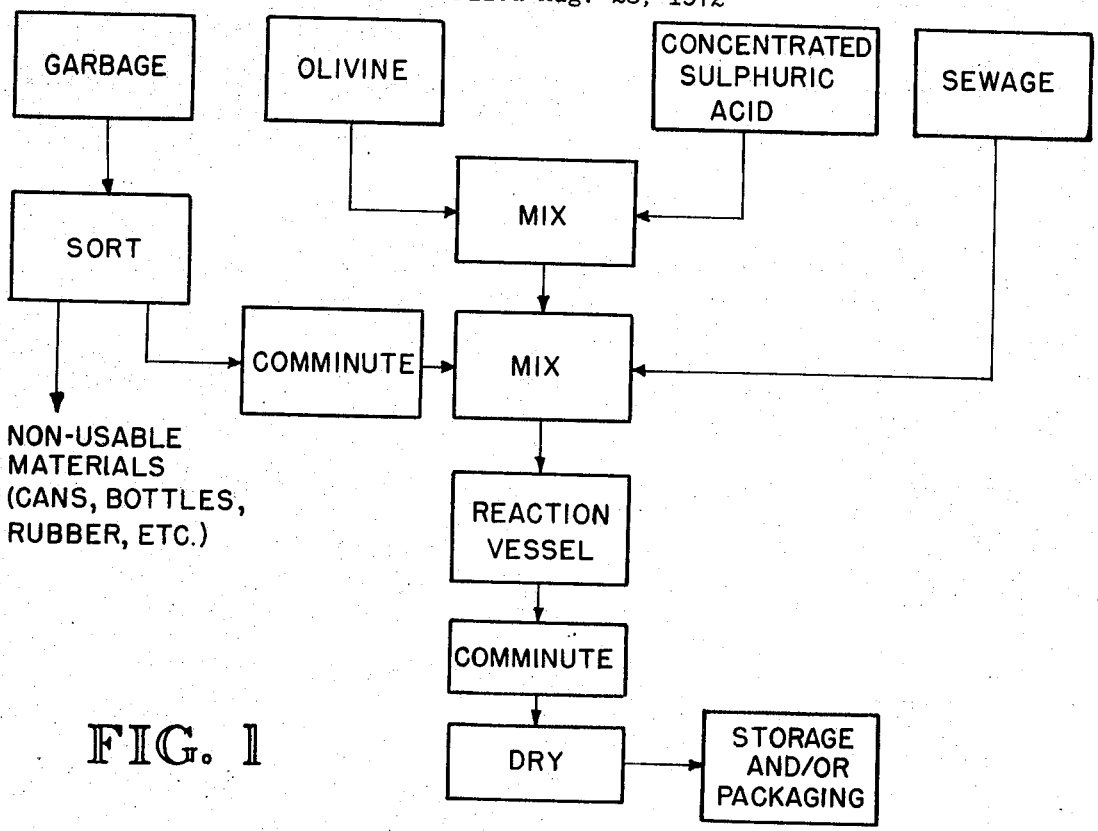
FIG. 1 is a schematic flow diagram of one means of carrying out the process of this invention.

The disposal of garbage and sewage is a major problem. Both of these organic wastes contain many valuable plant nutrients which should be returned to the soil. Organic wastes which can be treated in accordance with this process include dewatered raw or digested sewage, garbage from which inorganic materials such as glass, metal, and the like have been removed, manures, seaweeds, cellulosic or lignocellulosic materials, and mixtures of the foregoing. Generally, dewatered raw or digested sewage consists of 50% to 60% water. As illustrated by the flow diagram of FIG. 1, household garbage or other organic refuse is processed through a sorter for removal of the inorganic content thereof, such as cans, ceramic material, glass, etc. Generally, the garbage is hauled to the treatment site, where it is dumped. The garbage is then placed in the sorter by utilizing one or more power operated mobile scoops of the type commonly referred to as "Scoopmobiles." The sewage and garbage are then mixed together in a mixer or comminuting device, such as a hammermill, capable of breaking up large chunks of the waste and initially mixing the same. Powdered olivine and concentrated sulfuric acid are, at the same or different times, mixed together in a preferred ratio to form a paste; the paste is then metered into contact with the sewage, garbage, or mixture thereof. After the sewage and/or sewage-garbage and paste have been thoroughly mixed, the mixture is discharged to a reaction storage bin or vessel, which may be made of wood, concrete, or other suitable material, for storing the mixed waste for a substantial number of hours during which an exothermic reaction takes place, deodorizing, de-watering, and sterilizing the waste. After its digestion in the reaction vessel, it may be necessary to process the waste through a second comminuter for further grinding. Also, if the end product contains too much water, it may be necessary to further dry the product, either by mixing dry cellulosic materials, such as sawdust, hay, or straw, with the processed material or by drying the material in a suitable dryer. After being dried, the mixture may be either stored or packaged for sale.

Magnesium oxide is preferably supplied in the form of finely ground olivine or olivine flour, although commercially available magnesium oxide from other sources may be used. Olivine flour contains a high percentage of magnesium oxide as well as iron oxide, aluminum oxide, and trace elements of other minerals which are beneficial. Olivine is preferred because it supplies the required amount of magnesium oxide at a lower cost than that which can be obtained from other known minerals, or because the magnesium is in the form of magnesium oxide rather than partly in the form of magnesium carbonate which is endothermic in its reaction with sulfuric acid. Other sources of magnesium oxide, such as serpentine, brucite, or dead-burned magnesite, all of which contain a substantial amount of magnesium oxide, may be used. Some of these materials are more expensive than olivine and others are not capable of producing the high heat of reaction of magnesium oxide derived from the olivine flour. Use of these materials may require additional expense for calcining to drive off water of hydration and carbon dioxide.

The olivine mineral used in carrying out the process described contained from 45% to 52% magnesium oxide, 30% to 40% silicon dioxide, 6% to 8% iron oxide, and traces of aluminum, nickel, and manganese amounting to about 2%. The olivine is preferably ground to a fineness of not less than 100 mesh.

The olivine flour and concentrated sulfuric acid (95% to 98% sulfuric acid by weight) are mixed together in a stoichiometric ratio for an essentially complete reaction therebetween. Concentrated sulfuric acid (such as Oleum, or supersaturated sulfuric acid) is preferred, although ordinary commercial sulfuric acid may be used. Mixing of the concentrated sulfuric acid and olivine flour forms a paste which begins to generate heat and thickens considerably. It is preferred not to allow the paste to stand for more than about half an hour before mixing with the waste in order to take advantage of the heat generated by the chemical reaction between the olivine flour and sulfuric acid. Materials other than olivine flour used to supply the required magnesium oxide may require different ratios of sulfuric acid to the magnesium oxide containing component. The ratio should be varied to maintain a ratio of about 1 part, by weight, of magnesium oxide to 2 parts, by weight, of sulfuric acid.

Preferably, the garbage, raw sewage, and/or garbage-raw sewage are mixed before or at the time they are placed into the mixer; however, the raw sewage may be added to the garbage after comminution of the garbage to an extent that it does not contain chunks larger than about one inch in maximum size and is mostly pulp. The organic waste is mixed with the olivine flour-sulfuric acid paste in a preferred ratio of about 1 part, by weight, of the paste to from 3 to 4 parts, by weight, of the organic waste. This ratio is not critical but gives optimum results.

Within a short time after mixing of the organic waste and paste, a large amount of exothermic heat results, raising the temperature of the mixture to 175° to 250° F., depending on the insulating capacity of the reaction vessel, the source of magnesium oxide used, and other factors. Preferably, the heat generated should be sufficient to raise the temperature of the mixture to at least 212° F. or greater to insure complete and thorough sterilization. The reaction vessel is insulated and may be provided with a source of heat, such as live steam or electric thermal elements which, if necessary, can supply additional heat and/or moisture to complete the exothermic reaction. The reaction time may vary from 4 to 24 hours.

After reaction, the material is discharged and is generally dry enough to be handled with a power operated mobile scoop without further treatment. If the material being discharged contains too much water, a finely divided dry material having some plant food value, such as sawdust, hay, or straw, is added, preferably either before or while the waste is in the reaction vessel. Alternately, the material may be dried in a suitable dryer, such as a rotary drum dryer.

The exothermic reaction results in the formation of magnesium sulfate (Epsom salts), which acts as a penetrating solvent, penetrating the fibers of vegetable matter, cellulosic material, and the like and breaking them down by dissolving the lignin in them. During the exothermic reaction in the reaction vessel, the waste is deodorized and sterilized. It generally loses most of its free moisture and becomes spongy and porous. After it is cooled to a temperature not in excess of 140° F., it is again preferably comminuted to a finely divided state. The material then can be packaged, bagged, compressed into pellets, or extruded into bars for use as a soil amendment or fertilizer. Blowing the comminuted material through the air helps to vaporize any free moisture which remains in the material and also allows small pieces of heavy matter, such as glass and metal, to drop out.

The Epsom salts remaining in the end product are a valuable ingredient, particularly if the end product is to be used in soils having an alkali content which is objectionably high. If the pH of the end product is too low, finely ground limestone, or other suitable material, may be added. Both magnesium and sulfur contained in the Epsom salts are essential plant nutrients and both are more or less deficient in most soils.

Garbage to which no sewage is added, or other organic waste materials, may be processed in the same manner as the mixed garbage and sewage previously described.

The process is useful in disposal of large quantities of garbage and sewage at a cost lower than the presently employed methods. It also results in a solution to many of the solid waste disposal problems which now result in environmental pollution and returns to the soil many of the plant nutrients in the waste now lost by presently used disposal methods.

The following examples are indicative of the results obtained but are not intended to be limited in any manner:

Example 1—Powered olivine (200 mesh) was mixed with an equal amount, by weight, of 98% sulfuric acid, utilizing a gasoline powered Essick mortar mixer of 5 cubic feet capacity. After being mixed for 2 to 3 minutes, the paste was allowed to "set up" for about 15 minutes. Sewage sludge was then added in the ratio of 3 parts, by weight, of sludge to 1 part, by weight, of paste. After being mixed an additional 5 minutes, the material was transferred to 55 gallon steel drums. When the drums were full, covers were placed on them equipped with ½ inch pipes for taking temperature readings. Mercury thermometers were suspended in the pipes and blanket insulation packed about the steel drums. Two different types of sewage sludge were used: (1) digested, de-watered sewage sludge was obtained from the West Point treatment plant of the municipality of metropolitan Seattle (Metro), and (2) raw, de-watered sewage sludge was obtained from the treatment plant of Lynnwood, Wash. Analysis of the two sludge materials is shown in Table I:

TABLE I

|  | Moisture, percent | |
|---|---|---|
|  | Metro | Lynwood |
|  | 52.1 |  |
| Protein (N×6.25), percent | 2.9 |  |
| Bacteriological analysis: |  |  |
| Std. plate count per gram [1] | 120,000,000 | 240,000,000 |
| Coliform count, MPN per gram [2] | >11,000 | 110,000,000 |
| Fecal strep, MPN per gram [2] | >11,000 | 15,000,000 |
| pH [3] | 8.2 |  |

[1] Standard plate counts were reported in 1,000 as lowest dilution run was 1,000.
[2] Presumptive tests run on coliform counts and fecal strep.
[3] Run on a 10% solution.

Figure 2:
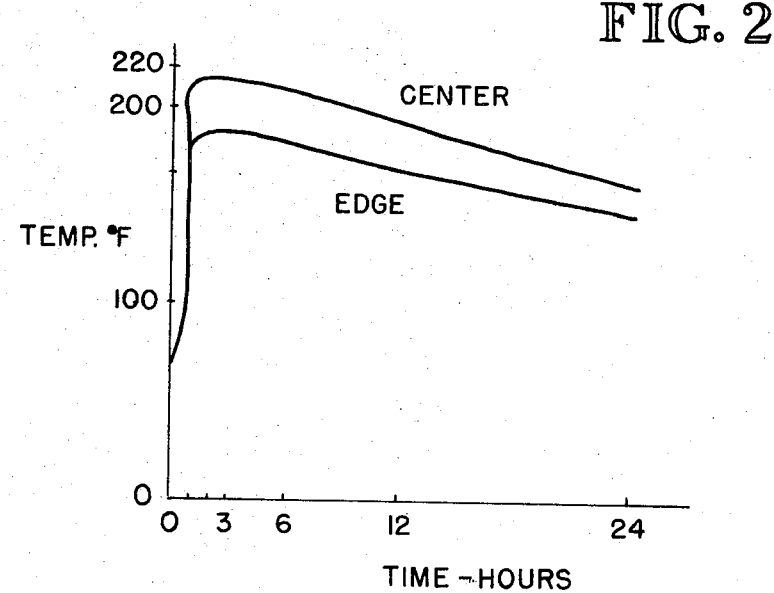
FIG. 2 is a time-temperature curve of a typical temperature curve of the exothermic reaction.

Temperature readings in the steel drums were taken at two locations, near the edge and in the center. A typical temperature versus time curve is shown in FIG. 2.

Sawdust or sander dust was added to some of the batches to reduce moisture and quick or powered limestone added to other batches to correct the pH.

The results of bacteriological tests of the plant food end product from both the Metro and Lynnwood sewage are shown in Table II:

TABLE II

| Bacteriological tests of plant food end product | Metro | Lynnwood |
|---|---|---|
| Standard plate count per gram [1] | <1,000 | <10 |
| Coliform count, MPN per gram [1] | <2 | <2 |
| Fecal strep, MPN per gram [1] | <2 | <2 |
| pH | [2] 3.5 | [3] 2.8 |

[1] Same as in Table I.
[2] Run on a 10% solution.
[3] Before addition of limestone. Run on a 50% solution.

The results show that, after treatment of the sewage, the standard plate count of bacteria was reduced to less than 1,000, which means essentially that no colonies of bacteria were observed. The coliform count was reduced to less than 2 and the fecal strep reduced to less than 2.

Example 2.—Dead-burned magnesite (flue dust) was used in place of olivine. An analysis of the dead-burned magnesite was as follows:

|  | Percent |
|---|---|
| Silica | 12.5 |
| $Fe_2O_3$ | 2.9 |
| $Al_2O_3$ | 4.8 |
| CaO | 3.0 |
| MgO | 63.4 |

1200 grams of damp magnesite was mixed with 900 grams sulfuric acid in a 2 to 3 gallon iron reaction vessel. 3600 grams of sewage sludge was added. After reaction, the resulting plant food was submitted for bacteriological analysis. The results are given below:

| Std. plate count | Less than 10 per gram. |
|---|---|
| Coliform count | Negative. |
| Fecal coliform | Do. |
| Fecal strep | Do. |

The plant food derived from the de-watered, digested sewage sludge of Metro (identified as A) and the plant food derived from the de-watered raw sewage sludge of Lynnwood, Wash. (identified as B) were submitted for quantitative analysis to determine the percent, by weight, of nitrogen, phosphorus, potassium, and magnesium, with determination of other elements by semi-quantitative spectrographic analysis of the ash. The results were as follows:

TABLE III

| Percent by weight | A | B |
|---|---|---|
| Analysis on dry sample basis: |  |  |
| Ash, residue on ignition | 62.02 | 50.80 |
| Total nitrogen (N) | 0.49 | 0.97 |
| Total phosphorus (P) | 0.27 | 0.17 |
| Total potassium (K) | 0.04 | 0.05 |
| Total magnesium (Mg) | 5.7 | 6.3 |
| Semi-quantitiative spectrographic analysis of ash: |  |  |
| Silicon (Si) | 23.0 | 24.0 |
| Aluminum (Al) | 5.2 | 2.1 |
| Iron (Fe) | 4.0 | 3.3 |
| Strontium (Sr) | 0.01 | 0.009 |
| Sodium (Na) | 1.9 | Trace |
| Calcium (Ca) | 4.3 | 6.6 |
| Magnesium (Mg) | 11.0 | 13.0 |
| Titanium (Ti) | 0.45 | 0.10 |
| Lead (Pb) | 0.06 | 0.05 |
| Phosphorus (P) | 0.41 | 0.44 |
| Boron (B) | 0.002 | Nil |
| Manganese (Mn) | 0.15 | 0.21 |
| Chromium (Cr) | 0.17 | 0.18 |
| Nickel (Ni) | 0.13 | 0.16 |
| Tin (Sn) | 0.02 | 0.03 |
| Vanadium (V) | 0.004 | Nil |
| Copper (Cu) | 0.03 | 0.04 |
| Silver (Ag) | 0.002 | 0.001 |
| Zinc (Zn) | 0.18 | 0.22 |
| Zirconium (Zr) | 0.007 | Nil |
| Cobalt (Co) | 0.01 | 0.02 |
| Potassium (K) | Trace | Nil |
| Other elements | Nil | Nil |

Some of the plant food material was applied to a patch of lawn: after three to four weeks, the treated patch acquired a definitely greener color than the surrounding non-treated areas. Plant food produced by this method is particularly valuable because no gas or elements are lost in preparation of the plant food as is the case both when sewage is processed in digesters and when garbage is composted. Instead, a valuable plant food material including trace elements is added to the soil. As earlier indicated, the method described is suitable for treatment of chicken manure, steer manure, or other manures, thereby eliminating the offensive odor, adding valuable nutrients to the soil, killing weed seeds, and making the end product more acceptable as a marketable plant food.

I claim:
1. The process of treating organic waste having water associated therewith to substantially dewater and sterilize the waste to produce an end product suitable for use as a plant food, comprising:
   mixing magnesium oxide and concentrated sulfuric acid together in a weight ratio of about 1 part magnesium oxide to 2 parts sulphuric acid to form a paste,
   mixing three to four parts by weight waste with one part by weight paste, and
   compacting the mixture in a reaction vessel wherein heat is generated by the exothermic reaction of the waste and paste, the mixture subjected to the exothermic reaction at a temperature and for a time, ranging from 4 to 24 hours, sufficient to sterilize the waste.
2. The process of claim 1 wherein the exothermic reaction heats waste to a temperature of at least 212° F. for a time ranging from 4 to 24 hours.
3. The process of claim 1 wherein the magnesium oxide is derived from olivine flour.
4. The process of claim 1 wherein the organic waste is comminuted garbage.
5. The process of claim 1 wherein the organic waste is raw sewage.
6. The process of claim 1 in which the organic waste is a mixture of comminuted garbage and raw sewage.
7. The process of claim 1 including injecting additional heat into the compacted mixture during the exothermic reaction in the mixture.
8. The process of claim 3 wherein the reaction product of olivine and sulfuric acid forms Epsom salts which remain in the end product.

References Cited
UNITED STATES PATENTS

| 108,369 | 10/1870 | Loewenstein | 71—12 |
| 111,357 | 1/1871 | Loewenstein | 71—13 |
| 1,025,622 | 5/1912 | Grossman | 71—12 X |
| 2,029,648 | 6/1936 | Austin | 71—14 X |
| 3,476,683 | 11/1969 | Liljegren | 71—12 X |
| 1,045,130 | 11/1912 | Doolittle | 71—21 X |
| 3,533,775 | 10/1970 | Brown | 71—13 X |

FOREIGN PATENTS

| 179,151 | 1923 | Great Britain | 71—25 |

SAMIH N. ZAHARNA, Primary Examiner

R. BARNES, Assistant Examiner

U.S. Cl. X.R.

71—13, 14, 40, 47